United States Patent [19]

Kawaguchi

[11] Patent Number: 4,688,208
[45] Date of Patent: Aug. 18, 1987

[54] TIME DIVISION EXCHANGE FOR CARRYING OUT A LOOP-BACK TEST

[75] Inventor: Tomohiro Kawaguchi, Yokohama, Japan

[73] Assignee: Fujitsu Limited, Kawasaki, Japan

[21] Appl. No.: 764,583

[22] Filed: Aug. 12, 1985

[30] Foreign Application Priority Data

Aug. 15, 1984 [JP] Japan ............................... 59-169277

[51] Int. Cl.⁴ .............................................. H04J 1/16
[52] U.S. Cl. ........................................ 370/15; 370/16; 379/5
[58] Field of Search ....................... 370/15, 85, 16, 68, 370/67; 379/5; 371/11, 22, 31

[56] References Cited

U.S. PATENT DOCUMENTS

| 4,486,877 | 12/1984 | Turner | 370/15 |
| 4,545,049 | 10/1985 | Kammerer et al. | 370/16 |
| 4,545,053 | 10/1985 | Raamot | 370/68 |
| 4,573,044 | 2/1986 | McConachie et al. | 370/16 |

Primary Examiner—Douglas W. Olms
Assistant Examiner—Curtis Kuntz
Attorney, Agent, or Firm—Staas & Halsey

[57] ABSTRACT

A time division exchange interchanges predetermined time slots of a time division multiplexed signal and returns it to a network during a loop-back test. A buffer memory in a time division multiplexed trunk is used to interchange the predetermined time slots. Alternatively, the buffer memory is provided in a return loop for use during the loop-back test. Therefore, it can be determined that the received signal is sent from another exchange and the loop-back test can be performed using ordinary exchanging processing procedures.

17 Claims, 7 Drawing Figures

TIME DIVISION EXCHANGE FOR CARRYING OUT A LOOP-BACK TEST

BACKGROUND OF THE INVENTION

The present invention relates to a time division exchange and, more particularly, to a time division exchange for which a loop-back test can be readily carried out.

In a time division exchange, a time division multiplexed trunk is provided between a time division switching network and a time division multiplexed line. This time division multiplexed trunk converts signal levels between the time division multiplexed line and the switching network, realizes bipolar and unipolar conversion and also controls phase matching.

FIG. 1 is a block diagram of an essential part of a time division exchange. Subscriber circuits 9, 10 detect the ON-Hook and OFF-Hook state of subscribers A and B, and this detected information is transferred to a central controller (CC) 2 via a control signal receiving memory (SRM) 7 and a signal receiving distributor (SRD) 4. Dial signals are sent from the subscribers A and B, and are transferred to the central controller 2 through the control signal receiving memory 7 and the signal receiving distributor 4. When it is determined that a dial signal indicates a call to a subscriber in another (i.e. remote) exchange as a result of analyzing the dial signal, a time division multiplexed trunk 12 is activated and a start signal is sent to the remote exchange in accordance with a specified time slot on a time division multiplexed line 19. A response signal is generated by the remote exchange in response to the start signal. The response signal is transferred in such a form that it is inserted in a specified time slot on a time division multiplexed line 20, so that it is received and detected by the time division multiplexed trunk 12 and is then sent to the central controller 2.

FIG. 2(a) is a diagram of a sending frame format for the time division multiplexed lines 19, 20, in which F is a frame synchronous signal; D1, D2, ... represents data, such as a voice PCM signal; C1, C2, ... are control signals such as a start signal, a response signal, etc.; and one frame is composed of, for example, 24 channels, CH1 to CH24.

The waveform (b) in FIG. 2 is an example of a control signal sent from the time division multiplexed trunk 12 on the calling side, while the waveform (c) is an example of a control signal sent to the time division multiplexed trunk 12 from the called side. The control signals of FIG. 2(b) and FIG. 2(c) correspond respectively to the control signals C1 and C2, shown in FIG. 2(a). For example, if a subscriber A originates a call, the central controller 2 receives and accumulates the dial signal sent from the subscriber A. When it is discriminated, as a result of analysis, that this call must be routed to a subscriber accommodated by another exchange, the central controller 2 activates the time division multiplexed trunk 12. A start command is written in a control signal sending memory (SSM) 6 through the signal receiving distributor 4. The content of the control signal sending memory 6 is inserted in a specified time slot and is transferred to the time division multiplexed trunk 12 from the network 1 through a digital line concentrator 11. The time division multiplexed trunk 12 separates the specified time slot (and the information inserted therein) in an interface circuit 13, and transfers it to a control circuit 14. When the control circuit 14 discriminates the start command, it sends a start signal to the remote exchange. When this start signal is sent at the timing t1 shown in FIG. 2(b) to the time division multiplexed line 19, for example, for channel CH1, the remote exchange sends the control signal C1 of channel CH1, as the response signal, on the time division multiplexed line 20.

When the time division multiplexed trunk 12 receives the response signal at the timing t2 as shown in FIG. 2(c), it is transferred to the control circuit 14 through the interface circuit 13. The control circuit 14 determines that it is a response signal for channel CH1, sent from the remote exchange in response to the start signal for channel CH1 sent on the time division multiplexed line 19, and sends it to the central controller 2 through the control signal receiving memory 7 and the signal receiving distributor 4. The central controller 2 controls the sending of dial signals in accordance with this response signal. For example, the dial signal may be transmitted at the timing t3 (FIG. 2(b)). The remote exchange receives the dial signal and calls the designated subscriber. When it detects an answer from the designated (i.e., called) subscriber, the remote exchange sends an answer signal corresponding to the designated subscriber. When the time division multiplexed trunk 12 receives the answer signal at the timing t4 (FIG. 2 (c)), the received answer signal is transferred to the control circuit 14 through the interface circuit 13. The control circuit 14 determines that it is an answer signal of the called subscriber, and it informs the central controller 2 of the reception of the answer signal through the control signal receiving memory 7 and the signal receiving distributor 4. The central controller 2 controls the network 1 by writing speech path information into the control memory 5, thereby causing it to establish a speech path between the calling subscriber A and the called subscriber accommodated by the other exchange.

In the type of switching equipment illustrated in FIG. 1, testing is essential in order to check for normal exchanging operations, normal operation of trunk circuits, etc. As in the case of a space division type exchange, when it is required to test the structure, including the network 1 and the time division multiplexed trunk 12, in the time division exchange, testing for a normal exchanging connection is performed by connecting the time division multiplexed lines 19, 20 which are connected to the time division multiplexed trunk 12 and by connecting, for example, the subscribers A and B with the time division multiplexed trunk 12.

When a return loop is established between the sending and receiving sides of the time division multiplexed trunk 12, the control signal shown in FIG. 2(b) and explained above, is sent from the interface circuit 17 in the sending side and is directly applied to the interface circuit 13 in the receiving side as the waveform shown in FIG. 2(d). Accordingly, when the start signal of channel CH1 is sent at the timing t1 to the remote switching equipment, it is equivalent to transferring a start signal for the same channel CH1 at the timing t1 from the distant exchange. However, since the control circuit 14 performs termination priority processing, transmission of the start signal of channel CH1 to be sent to the time division multiplexed line 19 from the interface circuit 17, is stopped. As a result, the start signal received by the interface circuit 18 is also stopped.

As explained above, if it is required to execute the loop-back test in order to check whether a call is properly terminated to the designated subscriber B from the calling subscriber A only by establishing the return loop connecting the sending side and the receiving side of the time division multiplexed trunk 12, then the loop-back test is impossible. This is because the start signal is transferred back to the time division muliplexed trunk 12 simultaneously with transmission of the start signal to the remote exchange from the time division multiplexed trunk 12.

Therefore, there is a disadvantage in that processing is required to consider the returned start signal as the answer signal in the time division multiplexed trunk 12, so that test processing procedures, which are different from the ordinary exchanging processing procedures must be employed. Thus, there is a need for a time division exchange which is capable of carrying out a loop-back test using normal exchanging processing.

SUMMARY OF THE INVENTION

It is an object of the present invention to provide a time division exchange capable of realizing a loop-back test using ordinary exchanging processing procedures, and without using special processing procedures for the loop-back test.

In particular, it is an object of the present invention to provide a time division exchange having a return loop connected to a time division multiplexed trunk, for carrying out the loop-back test.

The time division exchange of the present invention comprises means for interchanging information in predetermined time slots of a time division multiplexed signal and means for returning the interchanged information to a network. Therefore, it can be determined whether information on a received channel is sent from the other exchange and the received channel can be tested by ordinary exchanging processing procedures.

These together with other objects and advantages, which will be subsequently apparent, reside in the details of construction and operation, as more fully hereinafter described and claimed, reference being had to the accompanying drawings forming a part hereof, wherein like reference numerals refer to like parts throughout.

DESCRIPTION OF THE PREFERRED EMBODIMENTS

Figure 3:
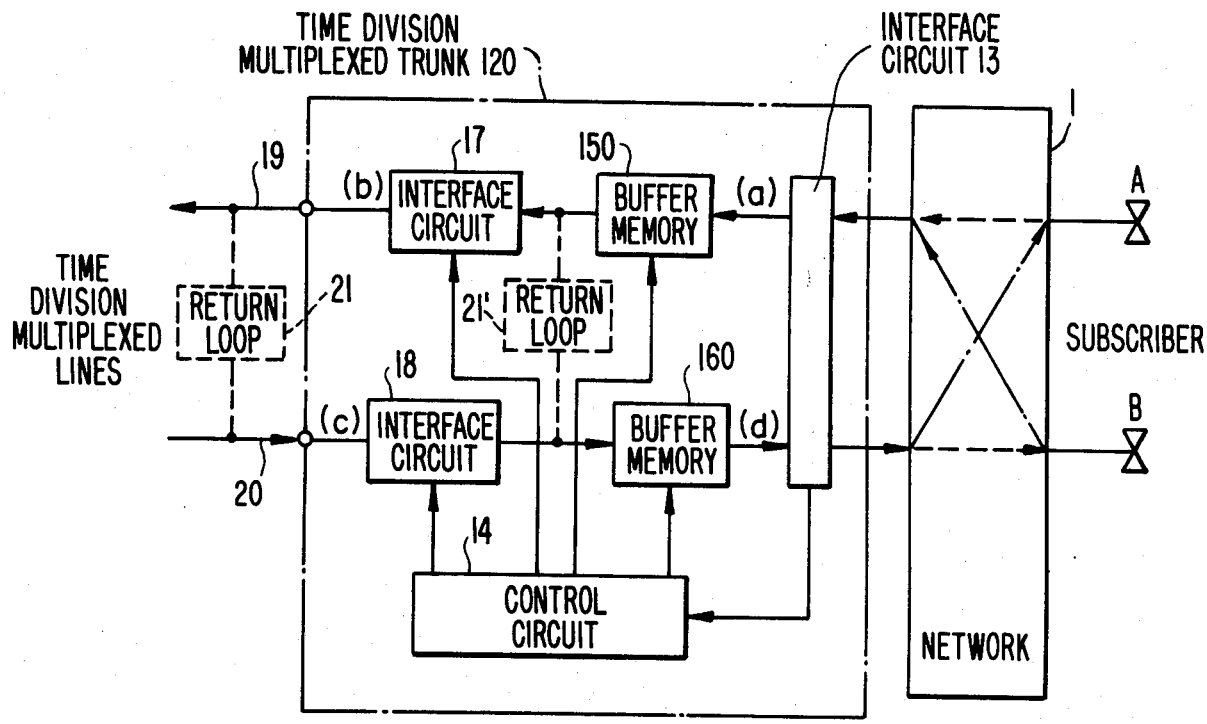
FIG. 3 is a block diagram of a time division exchange in accordance with the present invention.

FIG. 3 is a block diagram of an essential part of a preferred embodiment of a time division exchange in accordance with the present invention. A means for interchanging information in predetermined time slots is provided to any one of a return loop 21, a buffer memory 150 and a buffer memory 160. The return loop 21 connects time division multiplexed lines 19 and 20 but is not established in the ordinary speech processing procedures, during which interchanging between the particular time slots is not carried out.

In accordance with the present invention, when a loop-back test is to be performed, the return loop 21 is formed by connecting the time division multiplexed lines 19 and 20 with, for example, a U link. This return loop 21 is indicated by a dotted line in FIG. 3 since it may include the means for interchanging predetermined time slots. When the start signal for the remote exchange is sent to the time division multiplexed line 19 from the interface circuit 17, it is input to the interface circuit 18 through the return loop 21 and the time division multiplexed line 20.

In accordance with one embodiment of the present invention, the buffer memory 160 includes the means for interchanging information in at least two time slots. Therefore, the start signal is no longer considered to be for the same channel as the channel sending the start signal. When the answer signal is sent, it is returned by the return loop 21, and time slots are again interchanged by the buffer memory 160 so that the answer signal is returned to the channel which sent the start signal. Thus, a loop-back test can be realized by ordinary exchanging processing procedures.

Although the embodiment of FIG. 3 discloses 2 subscriber line (A, B), one of the lines can be trunk line or both of the lines can be trunk lines (Followings (in FIG. 6 and FIG. 7) are the same).

Figure 4:
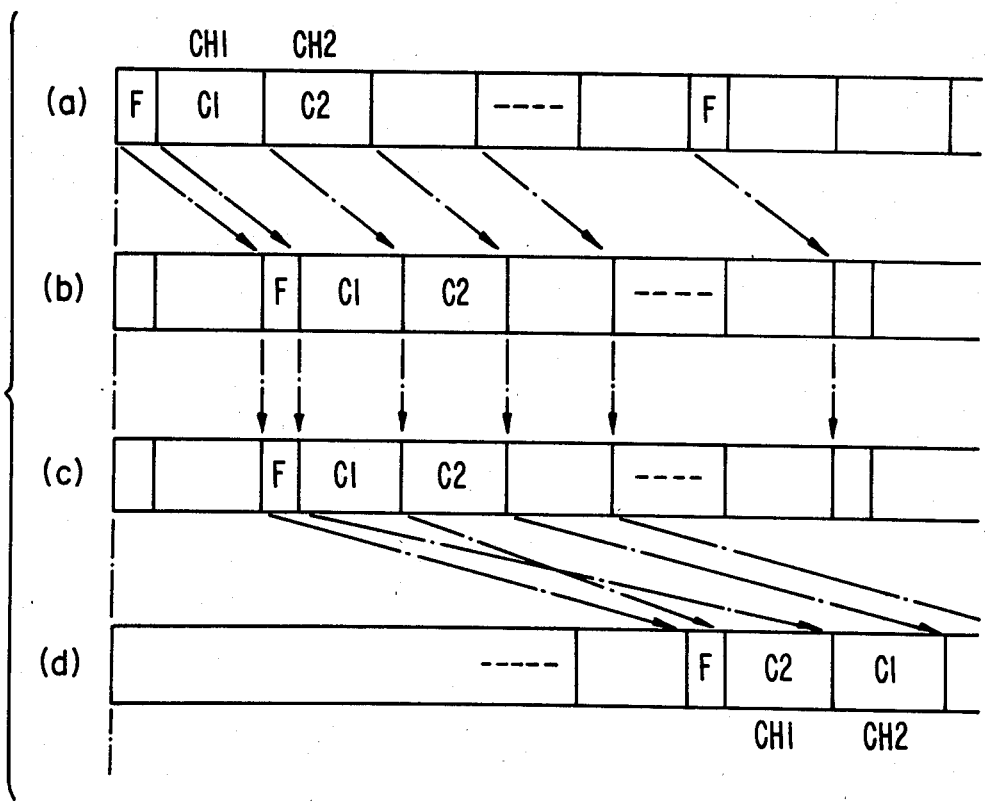
FIG. 4(a)–4(c) ARE diagrams of a frame format as applied to the time division exchange of FIG. 3.

FIG. 4 is a diagram for explaining the operations described above. FIG. 4(a) is a signal applied to the buffer memory 150 from the interface circuit 13, wherein data (such as the speech PCM signal) is not shown. For example, when subscriber A originates a call for the loop-back test, the start signal is written in the buffer memory 150 by the control signal C1 of channel CH1. Phase control is carried out so that the phase is matched to that of the time division multiplexed line 19, and the signal of FIG. 4(b) is sent on the time division multiplexed line 19 by the interface circuit 17. In this case, the signal of FIG. 4(b) is input to the interface circuit 18 from the time division multiplexed line 20 (as the signal of FIG. 4(c) after being returned through the return loop 21.

The signal written in the buffer memory 160 through the interface circuit 18 is frame-synchronized with the network 1, resulting in interchanging between the channels CH1 and CH2. Therefore, the signal of FIG. 4(d) (having interchanged time slots) is applied to the interface circuit 13 by the buffer memory 160. Namely, the start signal of the control signal C1 of the channel CH1 is transferred to the channel CH2 (corresponding to subscriber B) and the start signal is not returned to the channel CH1 corresponding to subscriber A.

The answer signal is applied to the buffer memory 150 from the interface circuit 13, as the control signal C2 of the channel CH2 as shown in FIG. 4(a) and is sent to the time division multiplexed line 19 from the interface circuit 17 (as shown in FIG. 4(b). This signal is returned by the return loop 21 to the time division multiplexed line 20, and is input to the interface circuit 18 in the form shown in FIG. 4(c). The signal written into the buffer memory 160 through the interface circuit 18 is frame-synchronized with the network 1 resulting in interchanging between channels CH1 and CH2. Therefore, the control signal C2 is transferred to the channel CH1 (as shown in FIG. 4(d)) and is processed as the answer signal corresponding to the start signal previously transmitted by the channel CH1 corresponding to the subscriber A.

In the channel CH1, a dial signal is sent when the answer signal is received. This dial signal is received by channel CH2, and, for example, the subscriber B is called. The answer signal for subscriber B is applied to the interface circuit 18 through the interface circuit 17 and the return loop 21, as the control signal C2 of channel CH2. However, since the channels are interchanged in the buffer memory 160, the called party's answer signal is received on the channel CH1 for the calling party. Thus, telecommunication starts.

In this embodiment, the return loop 21 is shown connected to the outputs of the time division multiplexed trunk 120. However, it is also possible to provide a return signal inside the time division multiplexed trunk 120, for example, by connecting the outputs of buffer memories 150 and 160 by a return loop 21'. Further, the return loop 21 (or 21'40 ) can be formed by a switch circuit which is closed at the time of a loop-back test under the control of the control circuit 14.

Figure 5:
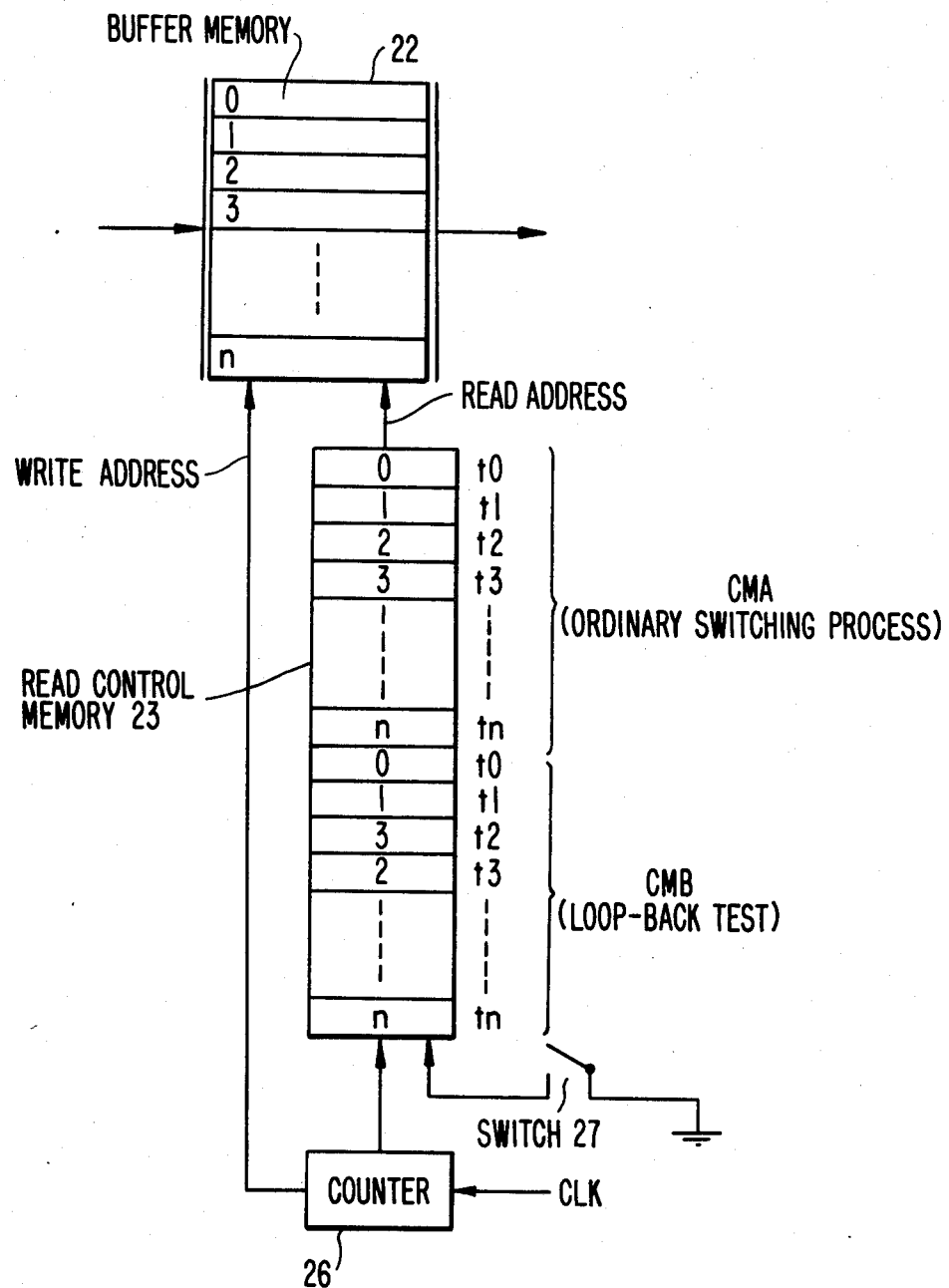
FIG. 5 is a block diagram of an example of a buffer memory 160 used as time slot interchanging means for the time division multiplexed trunk 120 of FIG. 3.

FIG. 5 is an example of the means for interchanging particular time slots which is included in the buffer memory 160. In a read control memory region CMA of a read control memory 23, address signals are sequentially stored, corresponding to the addresses 0 ... n of a buffer memory 22, while in a read control memory region CMB, for example, address signals are stored in such a manner that the address 1 is read at the time t1, the address 3 is read at the time t2 and the address 2 at the time t3 in order to interchange the signals at the second and third addresses of the buffer memory 22. A read address signal which is sent from the counter 26 includes a lower address signal for the read control memory 23, and an upper address signal is obtained via an ON-OFF switch 27. For example, access to the region CMA is made by turning OFF the switch 27.

In the ordinary switching process, the data D1 ... Dn+1 and control signals C1 ... Cn+1 of channels CHn+1 ... CHn are written sequentially in the addresses 0 ... n of the buffer memory 22 in accordance with write address signals sent from the counter 26. The buffer memory 22 is read out by the read address signal sent from the read control memory 23. When the circuit of FIG. 5 is used as the buffer memory 160 of the time division multiplexed trunk 120, the write address signal is formed in synchronization with a clock signal extracted from the signal received by the time division multiplexed line 20, and the read address signal is synchronized with the clock signal in the network 1. As a result, phase matching can be controlled between the time division multiplexed line 20 and the network 1.

During the loop-back test, when the switch 27 is turned ON and the return loop 21 is formed as explained above, the signal written in the address 3 is read at the time t2, and the signal written in the address 2 is read at the time t3, so that the position of the time slots is interchanged with respect to their position in the buffer memory 22. Namely, as explained above, the channels CH1 and CH2 are interchanged.

As indicated above, in one embodiment, the buffer memory 160 in the time division multiplexed trunk 120 is provided with the address counter 26 and read control memory 23 as shown in FIG. 5. The read control memory 23 is generally constituted by a read-only-memory (ROM) having a comparatively small capacity. Alternatively a RAM (randum-access-memory), can be used as the read control memory 23. In this case, the contents of the RAM circuit are rewritten at the time of the loop-back test to change the reading order of the buffer memory 22. Accordingly, it is easy to provide the region CMA used by normal switching processes and the region CMB used by the loop-back test. It is also possible to incorporate the switch 27 in such a structure in order to realize automatic operation in response to a command for a loop-back test. Further, as indicated above, in alternative embodiments, the interchanging means of FIG. 5 may be incorporated in the buffer memory 150 or as apparatus inserted in the return loop 21, instead of in the buffer memory 160.

Figure 6A:
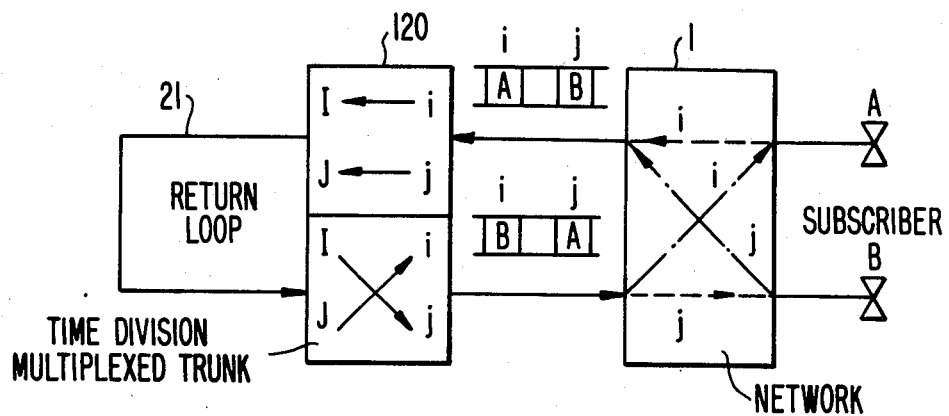
FIGS. 6(A), (B) and (C) are diagrams for explaining a loop-back test operation performed by the time division exchange of the present invention.

FIG. 6(A) is a simplified diagram for explaining the operation of the present invention, wherein the transmitting direction from the time division multiplexed line to the network 1 is defined as upstream, while the transmitting direction from the network 1 to the time division multiplexed line is defined as downstream. When the subscriber A and the subscriber B are connected by the return loop 21 through the time division multiplexed trunk 120 (with the downstream time division multiplexed line connected to the upstream time division multiplexed line by the return loop 21), a time slot i is assigned to the subscriber A while a time slot j is assigned to the subscriber B in the network 1. The data of subscriber A is set in the time slot i in the downstream highway between the network 1 and time division multiplexed trunk 120. Meanwhile, since the time slots are not interchanged in the downstream buffer memory of time division multiplexed trunk 120, the subscriber data is sent in the time slots I and J of the time division multiplexed line after only the transfer of i to I, and j to J. Since the time slots are interchanged (i.e., I to j, J to i) in the upstream buffer memory of time division multiplexed trunk 120, the data of subscriber B is set to the time slot i while the data of subscriber A is set to the time slot j in the upstream highway between the time division multiplexed trunk 120 and network 1. Accordingly, when the start signal generated by origination of a call by the subscriber A is sent to the downstream time division multiplexed line from the time division multiplexed trunk 120, it is returned by return loop 21 and then applied to the time division multiplexed trunk 120 from the upstream time division multiplexed line, thereby interchanging information in the time slot i (corresponding to the subscriber A) with information in the time slot j (corresponding to the subscriber B). As a result, the answer signal corresponding to the start signal of subscriber A is generated by interchanging time slots i and j. Thus, the loop-back test can be executed by ordinary exchanging processing procedures.

Figure 6B:
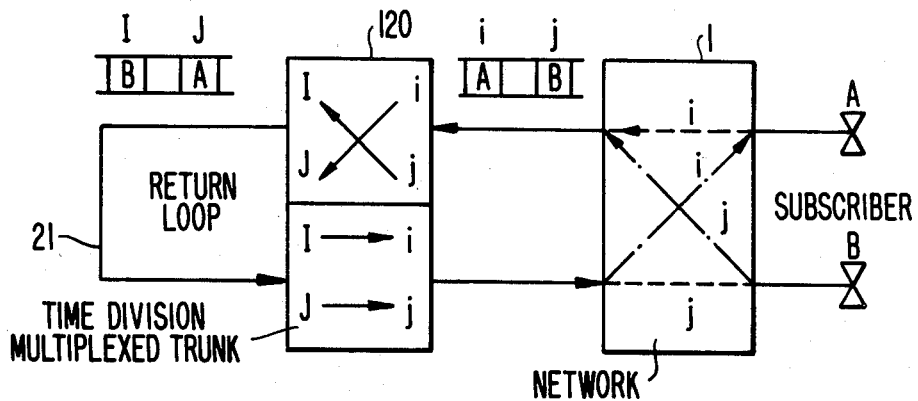

FIG. 6(B) is a diagram of the embodiment of the present invention, wherein the time slot interchanging function is performed by the buffer memory 150 in FIG. 3. Since the time slot i is changed to time slot J on the downstream time division multiplexed line, while the time slot j is changed to time slot I on the downstream time division multiplexed line in the downstream buffer memory, and the interchanging of time slots is not carried out in the upstream buffer memory, the loop-back test can be carried out using the ordinary exchanging processing procedures by interchanging the time slot i of subscriber A and the time slot j of subscriber B and establishing the return connection of the time division multiplexed trunk 120 with the return loop 21.

Figure 6C:
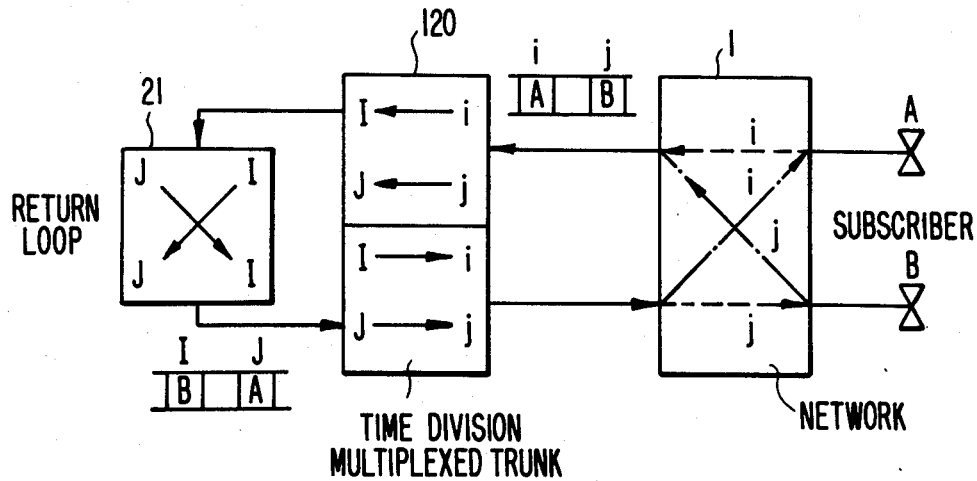

FIG. 6(C) is a diagram of the embodiment of the present invention wherein the time slot interchanging means is added as additional apparatus to the return loop 21. The time slot i of subscriber A and the time slot j of subscriber B can be interchanged by apparatus in the return loop 21, so that the loop-back test can be realized by the ordinary exchanging processing procedures.

Figure 1:
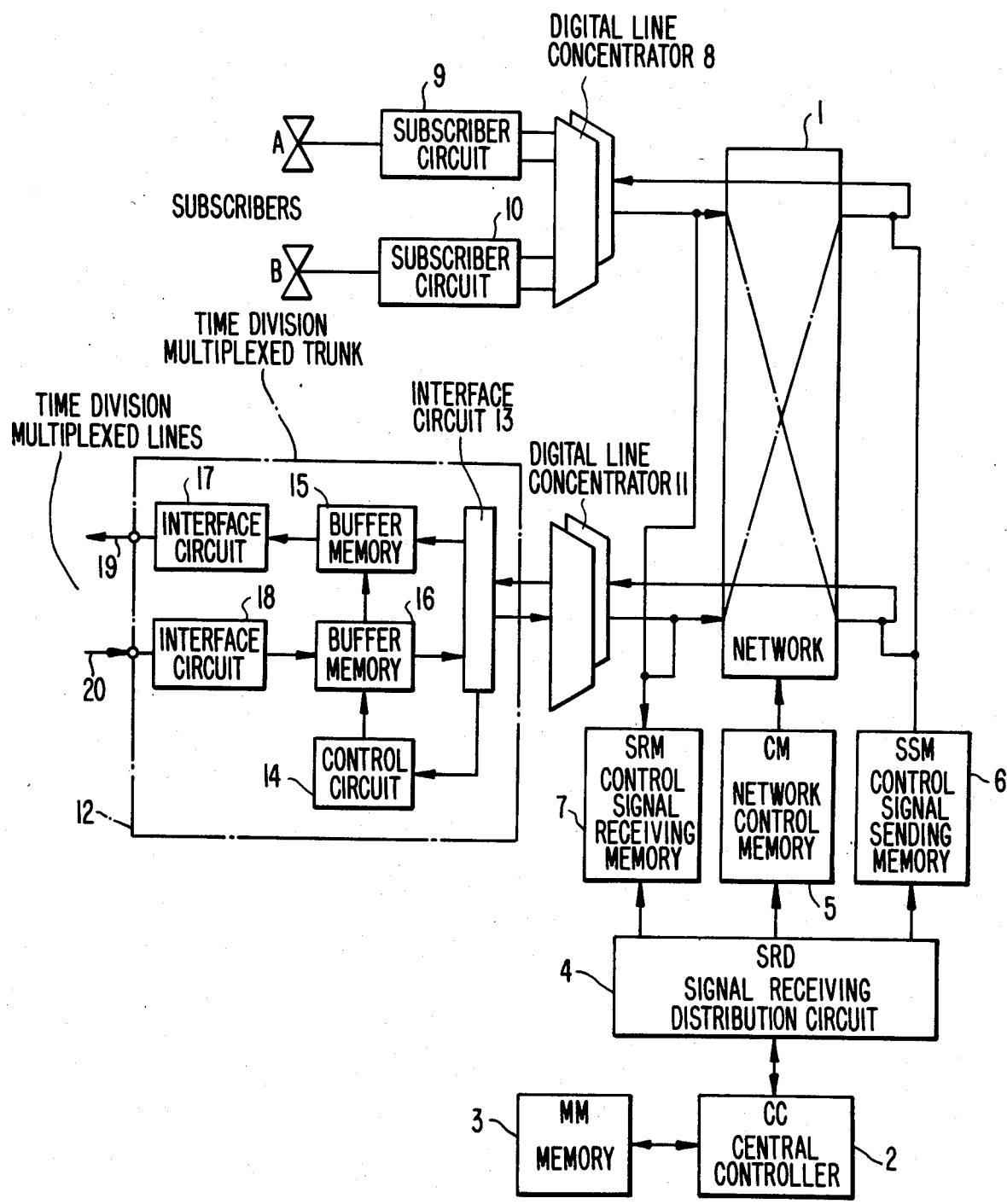
FIG. 1 is a block diagrm of an essential part of a prior art time division exchange.
Figure 2:
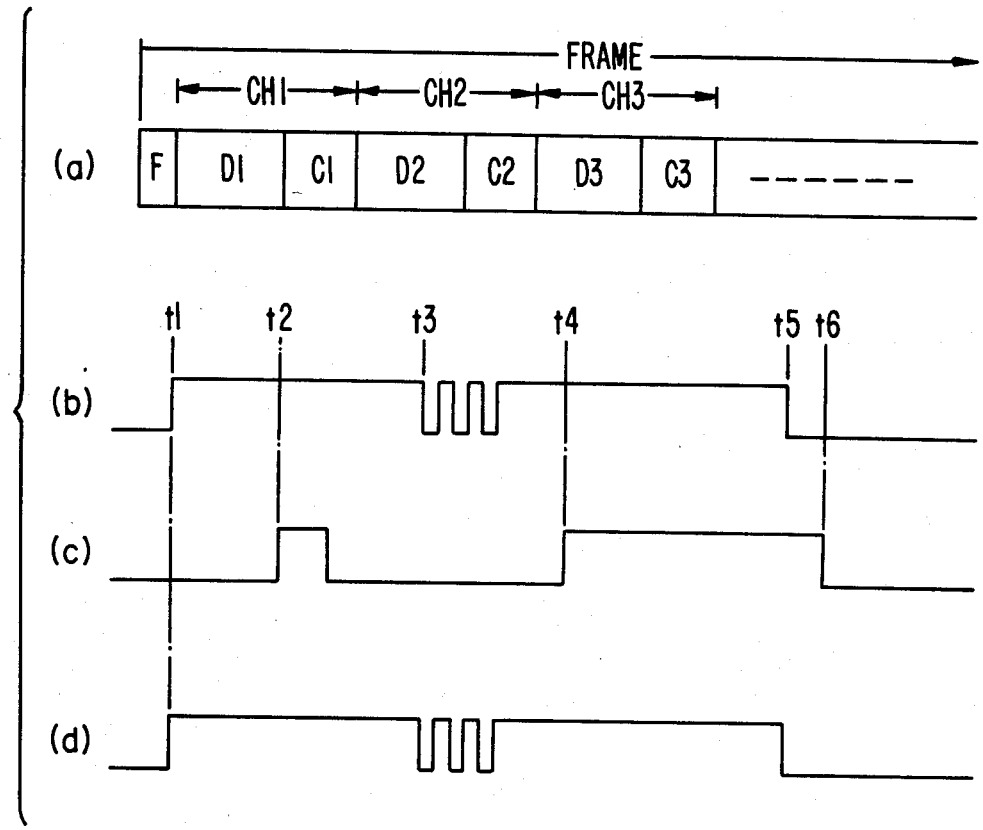
FIG. 2(a) is a diagram of a sending frame format for time division multiplexed lines.
FIGS. 2(b), 2(c) and 2(d) are waveforms of control signals sent and received by a time division multiplexed trunk 12.
Figure 7:
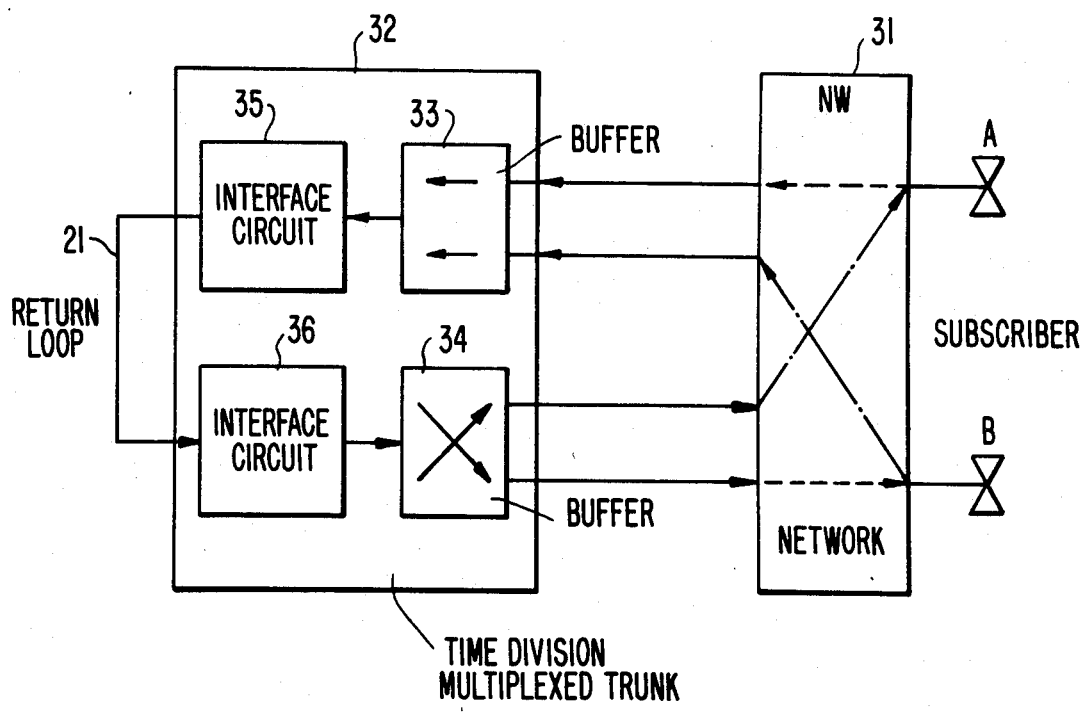
FIG. 7 is a block diagram of an essential part of an embodiment of a time division exchange in accordance with the present invention, wherein plural highways are provided.

Referring to the embodiment of FIG. 7, a network 31 and a time division multiplexed trunk 32 are connected through two lines of upstream highway and two lines of downstream highway. A buffer 33 of time division multiplexed trunk 32 is provided with the function of multiplexing signals on the downstream highway to the single line of downstream time division multiplexed line, while a buffer 34 is provided with the function of demultiplexing the multiplexed signals on the single line of the upstream time division multiplexed line to the two lines of the upstream highway. Such multiplexing and demultiplexing operations are carried out utilizing the buffer memories 33 and 34. During the loop-back test, as in the case of the embodiment described above, means for interchanging the time slots is included in any one of the downstream buffer 33, the upstream buffer 34 or the return loop 21. As a result, the loop-back test can be realized by the ordinary switching processing procedures.

Although the embodiment of FIG. 7 discloses only 2 lines per highway, the present invention can also be adapted for use with time division exchanges having a highway connecting the network 31 and the time division multiplexed trunk 32 which include any number of lines.

As explained above, the present invention realizes the interchanging of time slots during the loop-back test by providing an interchanging means for interchanging the time slots in the time division multiplexed trunk 120 (32) or in the return loop 21. As a result, when the start signal is sent from the time division multiplexed trunk 120 (32) it is received and processed as the start signal by another time slot. Moreover, if the answer signal is sent, it is processed as the answer signal responsive to the start signal. Accordingly, the loop-back test can be realized by using only ordinary exchanging processing procedures and without using special processing procedures for the loop-back test, through connection of the return loop 21 to the time division multiplexed trunk 120(32).

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed is:

1. A time division exchange for serving plural lines, comprising:
   a network, coupled to the lines, for transmitting and receiving time division multiplexed signals;
   a time division multiplexed trunk, coupled to said network, for providing, as an output time division multiplexed signal to another exchange, the time division multiplexed signal transmitted by said network, and for providing an input time division multiplexed signal to said network as the received time division multiplexed signal, said time division multiplexed trunk including means for interchanging predetermined time slots in one of the time division multiplexed signals when a loop-back test is to be performed; and
   return means, coupled to said time division multiplexed trunk, for receiving the output time division multiplexed signal and for returning it to said time division multiplexed trunk, as the input time division multiplexed signal, during the loop-back test.

2. A time division exchange according to claim 1, wherein said interchanging means comprises a buffer memory circuit for interchanging the predetermined time slots.

3. A time division exchange according to claim 2, wherein said buffer memory circuit includes a buffer memory for storing data, and means for interchanging the order in which the information in the predetermined time slots is read out of the buffer memory.

4. A time division exchange according to claim 1, further comprising:
   an upstream highway having plural lines for connecting said network and said time division multiplexed trunk; and
   a downstream highway having plural lines for connecting said network and said time division multiplexed trunk.

5. A time division exchange for serving plural lines, comprising:
   a network, coupled to the lines, for transmitting and receiving time division multiplexed signals;
   a time division multiplexed trunk, coupled to said network, for providing, as an output time division multiplexed signal to another exchange, the time division multiplexed signal transmitted by said network, and for providing an input time division multiplexed signal; and
   return means, coupled to said time division multiplexed trunk, for interchanging predetermined time slots of the output time division multiplexed signal and for returning the input time division multiplexed signal having interchanged time slots to said time division multiplexed trunk during a loop-back test, said time division multiplexed trunk providing the input time division multiplexed signal having the interchanged time slots to said network as the received time division multiplexed signal.

6. A time division exchange according to claim 5, further comprising:
   an upstream highway having plural lines for connecting said network and said time division multiplexed trunk; and
   a downstream highway having plural lines for connecting said network and said time division multiplexed trunk.

7. A time division exchange according to claim 5, wherein said return means includes a buffer memory circuit for interchanging the predetermined time slots.

8. A time division exchange according to claim 7, wherein said buffer memory circuit includes a buffer memory for storing data, and means for interchanging the reading order of the data stored in the buffer memory.

9. A time division exchange, connected to at least one other exchange, for serving plural lines, comprising:
a network, coupled to the lines, for transmitting a first time division multiplexed signal and for receiving a second time division multiplexed signal;
a time division multiplexed trunk, coupled to said network and to another exchange, for receiving the first time division multiplexed signal and for providing a third time division multiplexed signal as an output to the other exchange, said time division multiplexed trunk receiving a fourth time division multiplexed signal from the other exchange and for providing the second time division multiplexed signal to said network, said time division multiplexed trunk including means for interchanging predetermined time slots in one of the time division multiplexed signals when a loop-back test is to be performed; and
return means, coupled to said time division multiplexed trunk, for receiving the third time division multiplexed signal and for returning the third time division multiplexed signal to said time division multiplexed trunk, as the fourth time division multiplexed signal, during the loop-back test.

10. A time division exchange according to claim 9, wherein said interchanging means comprises a buffer memory circuit for interchanging the predetermined time slots.

11. A time division exchange according to claim 10, wherein said buffer memory circuit includes a buffer memory for storing data, and means for interchanging the order in which the information in the predetermined time slots is read out of the buffer memory.

12. A time division exchange according to claim 9, further comprising:
an upstream highway having plural lines for connecting said network and said time division multiplexed trunk; and
a downstream highway having plural lines for connecting said network and said time division multiplexed trunk.

13. A time division exchange according to claim 9, wherein said time division multiplexed trunk comprises:
first buffer means for receiving the first time division multiplexed signal and for outputting the third time division multiplexed signal; and
second buffer means for receiving the fourth time division multiplexed signal and for outputting the second time division multiplexed signal to said network.

14. A time division exchange according to claim 13, wherein said first buffer means includes said means for interchanging predetermined time slots in the first time division multiplexed signal when a loop-back test is to be performed.

15. A time division exchange according to claim 14, wherein said first buffer means comprises:
a buffer memory for receiving and storing the first time division multiplexed signal;
a read control memory connected to said buffer memory, said read control memory having a first portion for providing a read address for reading data from said buffer memory during an ordinary switching process and having a second portion for providing a read address for reading data from said buffer memory during the loop-back test; and
switching means for selecting one of the first and second portions of said read control memory to provide the read address for reading data from said buffer memory as the third address for reading data from said buffer memory as the third time division multiplexed signal.

16. A time division exchange according to claim 13, wherein said second buffer means includes said means for interchanging predetermined time slots in the fourth time division multiplexed signal when a loop-back test is to be performed.

17. A time division exchange according to claim 16, wherein said second buffer means comprises:
a buffer memory for receiving and storing the fourth time division multiplexed signal;
a read control memory connected to said buffer memory, said read control memory having a first portion for providing a read address for reading data from said buffer memory during an ordinary switching process and having a second portion for providing a read address for reading data from said buffer memory during the loop-back test; and
switching means, connected to said read control memory, for selecting one of the first and second portions of said read control memory to provide the read address for reading data from said buffer memory as the second time division multiplexed signal.

* * * * *

UNITED STATES PATENT AND TRADEMARK OFFICE
CERTIFICATE OF CORRECTION

PATENT NO. : 4,688,208
DATED : AUGUST 18, 1987
INVENTOR(S) : TOMOHIRO KAWAGUCHI

It is certified that error appears in the above-identified patent and that said Letters Patent is hereby corrected as shown below:

Col. 3, line 54, "4(a)-4(c)" should be --4(a)-4(d)--.

Col. 4, line 53, after ")" insert --)--.

Col. 5, line 29, delete "40".

Signed and Sealed this

Second Day of February, 1988

Attest:

DONALD J. QUIGG

Attesting Officer    Commissioner of Patents and Trademarks